(12) United States Patent
Gu

(10) Patent No.: US 8,966,251 B2
(45) Date of Patent: Feb. 24, 2015

(54) LARGE-SCALE DATA PROCESSING CLOUD COMPUTING SYSTEM

(75) Inventor: Lei Gu, Shanghai (CN)

(73) Assignee: Shanghai Zhijing Biological Technology Co., Ltd., Shanghai (CN)

( * ) Notice: Subject to any disclaimer, the term of this patent is extended or adjusted under 35 U.S.C. 154(b) by 166 days.

(21) Appl. No.: 13/555,167

(22) Filed: Jul. 22, 2012

(65) Prior Publication Data

US 2013/0262866 A1   Oct. 3, 2013

(30) Foreign Application Priority Data

Mar. 27, 2012  (CN) .......................... 2012 1 0083287

(51) Int. Cl.
*H04L 29/06* (2006.01)

(52) U.S. Cl.
USPC ......................................................... 713/167

(58) Field of Classification Search
USPC ......................................................... 713/167
See application file for complete search history.

(56) References Cited

U.S. PATENT DOCUMENTS

| | | | |
|---|---|---|---|
| 7,110,545 B2* | 9/2006 | Furuya et al. ................. | 380/259 |
| 7,804,498 B1* | 9/2010 | Graham et al. ............... | 345/419 |
| 8,230,517 B2* | 7/2012 | Karamchedu et al. .......... | 726/29 |
| 8,607,242 B2* | 12/2013 | Clarke .......................... | 718/104 |
| 8,656,019 B2* | 2/2014 | Chikando et al. ............. | 709/226 |
| 8,695,053 B2* | 4/2014 | Huang .......................... | 725/110 |
| 8,862,170 B2* | 10/2014 | Lee et al. ...................... | 455/507 |
| 2002/0194473 A1* | 12/2002 | Pope et al. ..................... | 713/168 |
| 2008/0082523 A1* | 4/2008 | Momosaki et al. ............... | 707/5 |
| 2011/0061086 A1* | 3/2011 | Huang .......................... | 725/110 |
| 2011/0153824 A1* | 6/2011 | Chikando et al. ............. | 709/226 |
| 2011/0264920 A1* | 10/2011 | Rieffel et al. ................. | 713/189 |
| 2012/0165055 A1* | 6/2012 | Lee et al. ...................... | 455/507 |
| 2012/0256916 A1* | 10/2012 | Kitamura et al. ............. | 345/419 |
| 2013/0208966 A1* | 8/2013 | Zhao et al. .................... | 382/131 |
| 2013/0262866 A1* | 10/2013 | Gu, Lei ......................... | 713/167 |

* cited by examiner

*Primary Examiner* — Bradley Holder

(57) ABSTRACT

A cloud computing system includes a native client; and a platform system providing distributed resources and dynamic resource allocation, for receiving raw data uploaded by the native client and returning computed results, including: a data extracting module for receiving the raw data; an encrypting and decrypting module, wherein only a single user is permitted to simultaneously invoke the data extracting module and the encrypting and decrypting module and process the raw data; the encrypting and decrypting module generates a key during encrypting and returns the key to the user for keeping and the computed results to the native client after receiving the key inputted by the user; and a data computing module, for computing raw data encrypted by the encrypting and decrypting module and returning results to the encrypting and decrypting module, wherein the data computing module is shared by all users and can be invoked simultaneously by several users.

19 Claims, 6 Drawing Sheets

| user name | mission | unit | CPU |
|---|---|---|---|
| 20004 | reading | extracting unit | 110 |
| 30401 | encrypting | encrypting and decrypting unit | 102 |
| 15321 | computing | computing unit | 321 |

LARGE-SCALE DATA PROCESSING CLOUD COMPUTING SYSTEM

BACKGROUND OF THE PRESENT INVENTION

1. Field of Invention

The present invention relates to a large-scale data processing system, and more particularly to a cloud computing system and a method of system control and data encryption.

2. Description of Related Arts

A large-scale data parallel processing system using ways of native communications has been widely applied. In such a system, users process raw data through the parallel system at a local place and then get results returned.

In recent years, on one hand, it is very common to use a cloud computing system or a software-as-a-service (SaaS) mode to develop local tools into a cloud computing system. On the other hand, machine learning systems become popular. Data of a customer computer is sent to a server computer group through intranet, and after the server computer executes control the screen of the customer computer operated by the user displays received content. This forms a computer system which uses a large number of distributed computing resources to convert and process data. It will become widely applied if such a system can be built on a cloud.

It is a common encryption mode for each user to get its only key and to encrypt and decrypt data through the key. However, in existing encryption modes, security is not high; to be more specific, following defects exist, such as content on the server computer group is not encrypted and can be read by others directly; the server computer has good openness and if the encryption and the decryption are put on the cloud, leakage is highly possible; if exclusiveness is not increased, the leakage is also highly possible.

SUMMARY OF THE PRESENT INVENTION

An object of the present invention is to provide a large-scale data processing cloud computing system which is able to securely use cloud to realize encryption and decryption. The cloud could be part of internet, however not limited to. The cloud could be any platform supporting large scale data computation and exchange.

Another object of the present invention is to provide a large-scale data processing cloud computing system, wherein keys are generated through content and each user keeps its own key, so as to increase security and interactivity; the security is embodied in that the cloud includes no actual content of words but only encrypted content, and the interactivity is embodied in that each step involves participation and decision of the user, so as to overcome defects of an existing cloud.

Another object of the present invention is to provide a large-scale data processing cloud computing system whose modules for encryption and decryption have exclusiveness, wherein once one user invokes, other users are forbidden to invoke, so as to further improve the security of the present invention.

Accordingly, in order to accomplish the above objects, the present invention provides a cloud computing system comprising:

a native client which is a device having message storage and transmission ability comprising data aggregators like wireless sensors; and a platform system providing distributed resources and dynamic resource allocation, for receiving raw data uploaded by the native client and returning computed results, comprising:

a data extracting module for receiving the raw data;

an encrypting and decrypting module, wherein only a single user is permitted to simultaneously invoke the data extracting module and the encrypting and decrypting module and process the raw data; the encrypting and decrypting module generates a key during a process of encrypting, returns the key to the single user to be kept and returns the computed result to the native client after receiving the key inputted by the single user; and a data computing module, for computing the raw data encrypted by the encrypting and decrypting module and returning results to the encrypting and decrypting module, wherein the data computing module is shared by all users and can be invoked simultaneously by several users.

wherein, further, the users are able to use the system repeatedly and when the users use the system subsequently the data computing module provides an intelligent verification function to judge whether new data accords with historical data.

These and other objectives, features, and advantages of the present invention will become apparent from the following detailed description, the accompanying drawings, and the appended claims.

DETAILED DESCRIPTION OF THE PREFERRED EMBODIMENT

Figure 1:
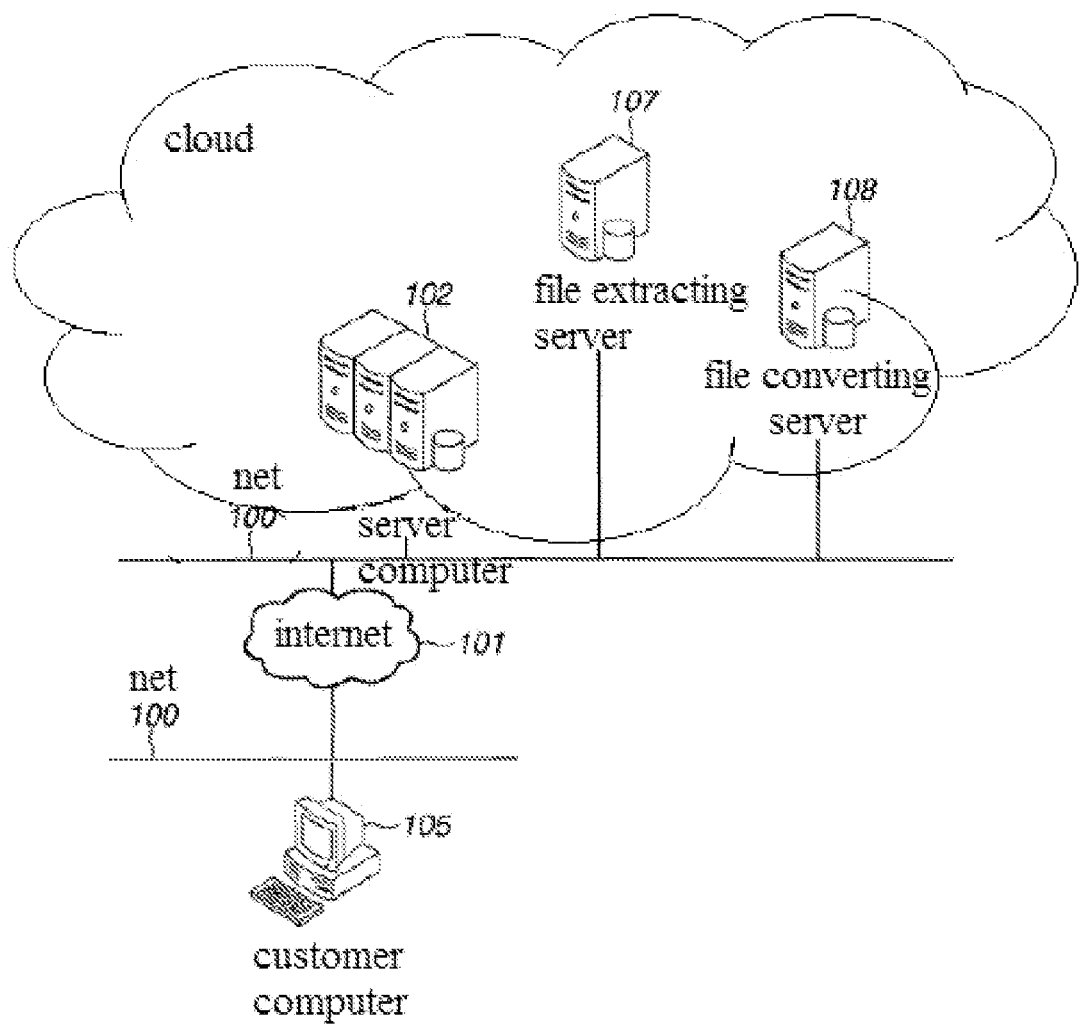
FIG. 1 is a structural sketch view of a large-scale data cloud computing system according to a preferred embodiment of the present invention.
Figures 2, 3:
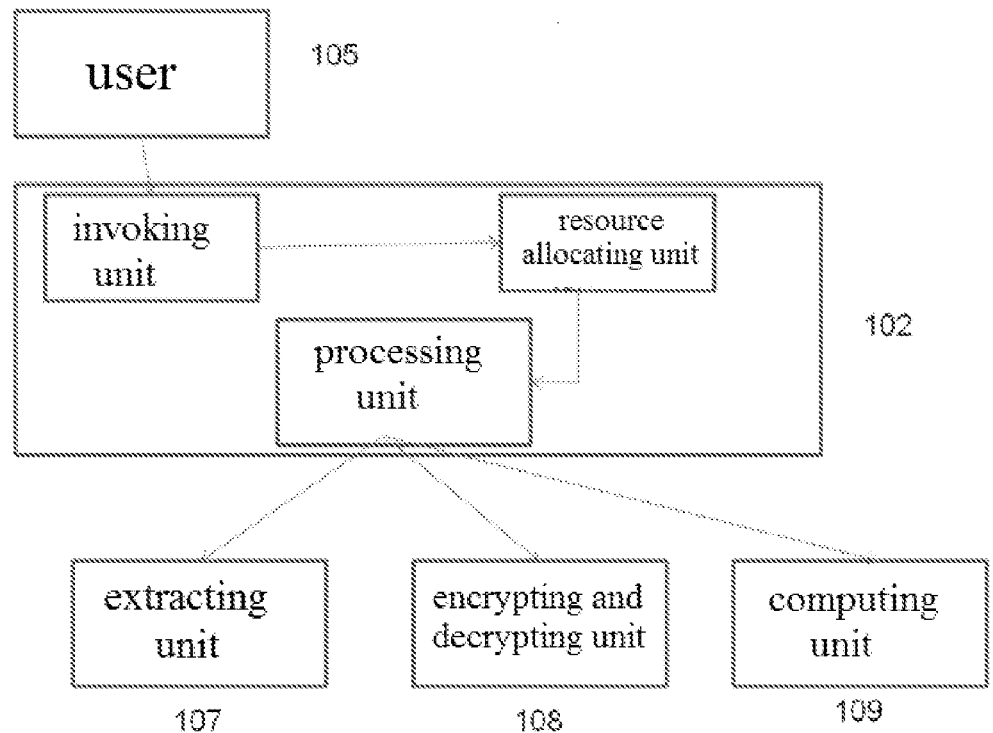
FIG. 2 is a block diagram of an exemplary function of each device of the large-scale data cloud computing system according to the preferred embodiment of the present invention.
FIG. 3 is a distribution diagram of the large-scale data cloud computing system according to the preferred embodiment of the present invention.
Figure 4:
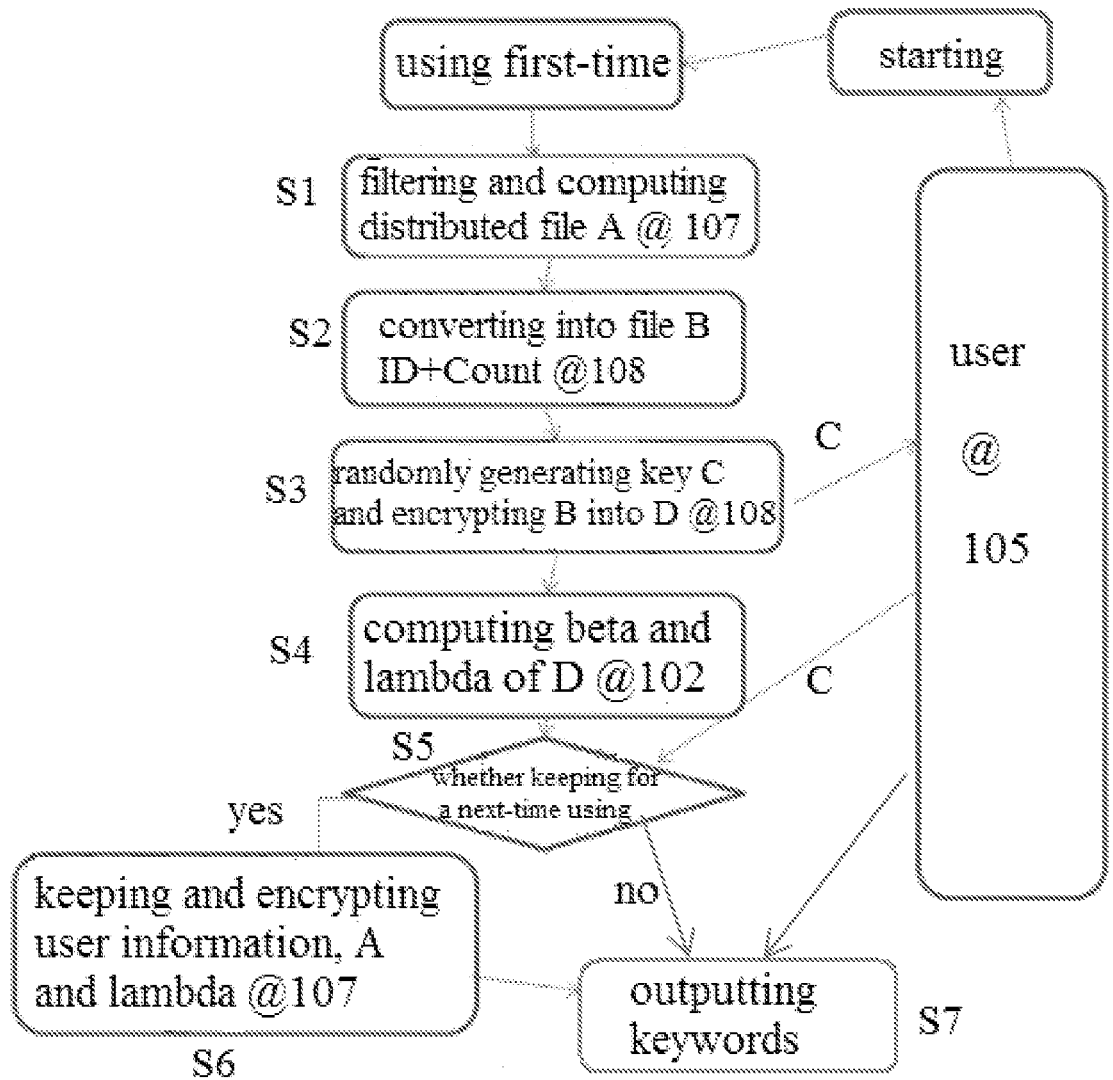
FIG. 4 is an exemplary flow chart of a series of steps when a user uses the large-scale data cloud computing system for a first time according to the preferred embodiment of the present invention.
Figure 5:
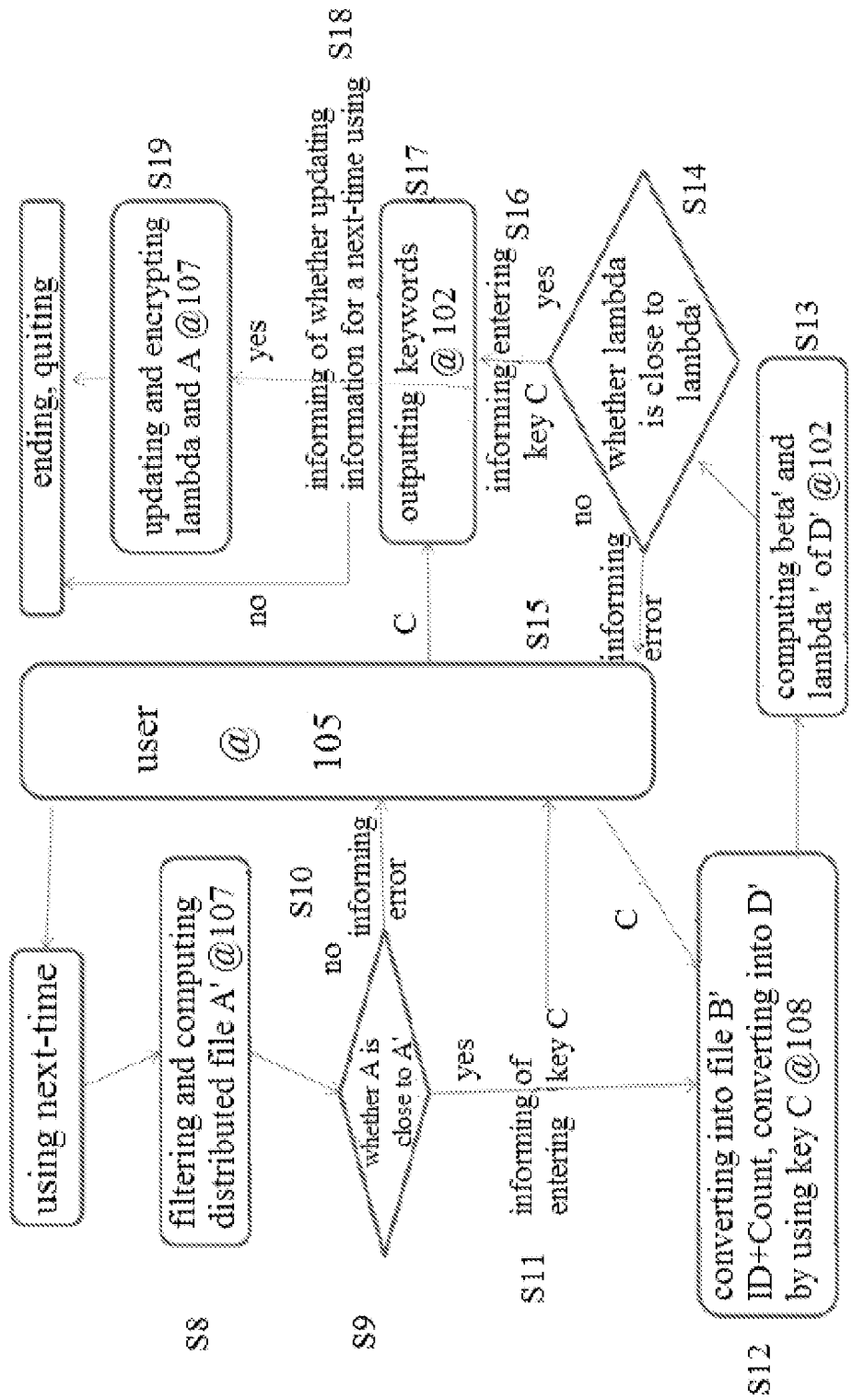
FIG. 5 is an exemplary flow chart of a series of steps when the user uses the large-scale data cloud computing system subsequently according to the preferred embodiment of the present invention.
Figure 6:
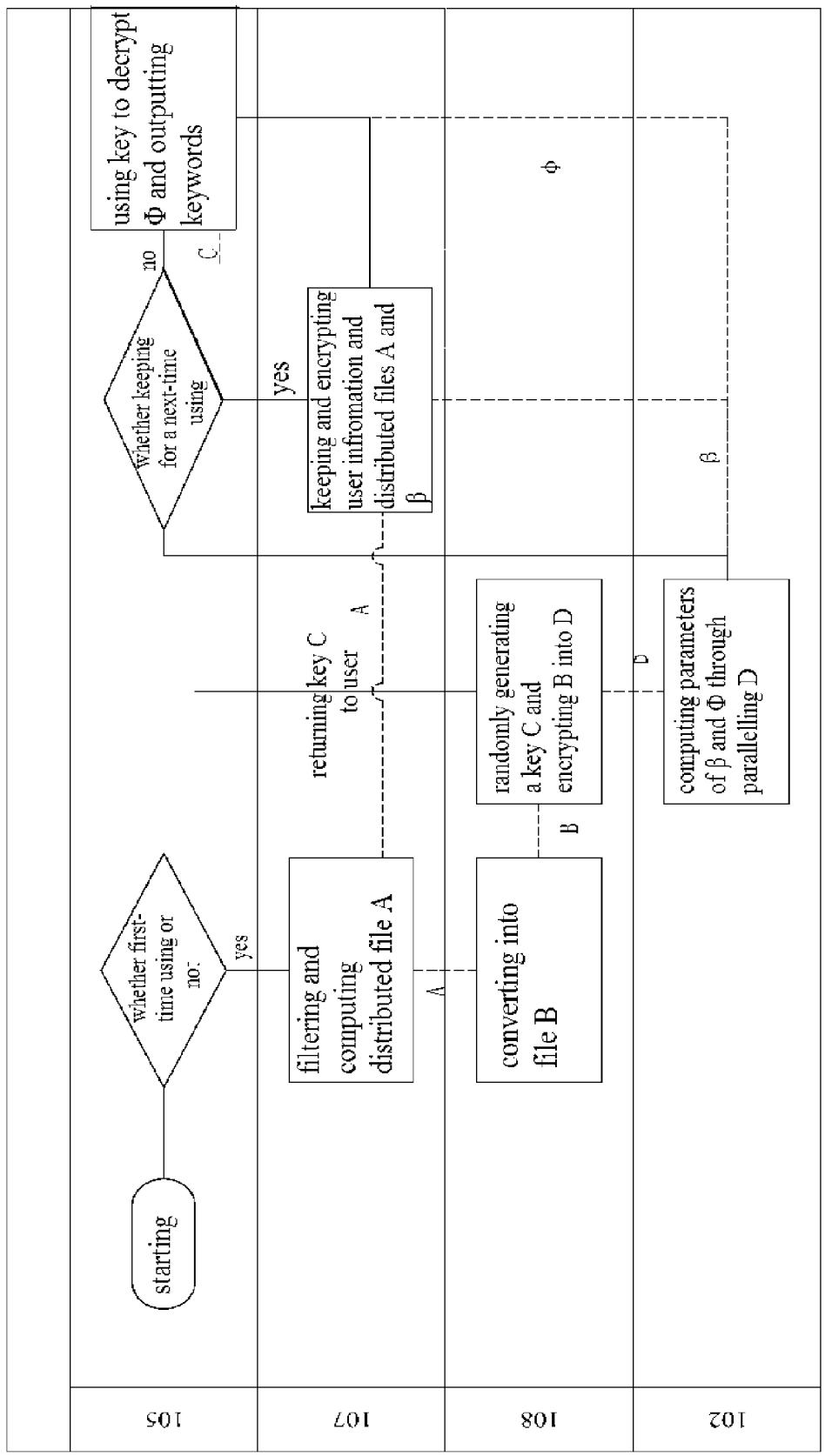
FIG. 6 is a flow chart of using the large-scale data cloud computing system for the first time according to the preferred embodiment of the present invention.
Figure 7:
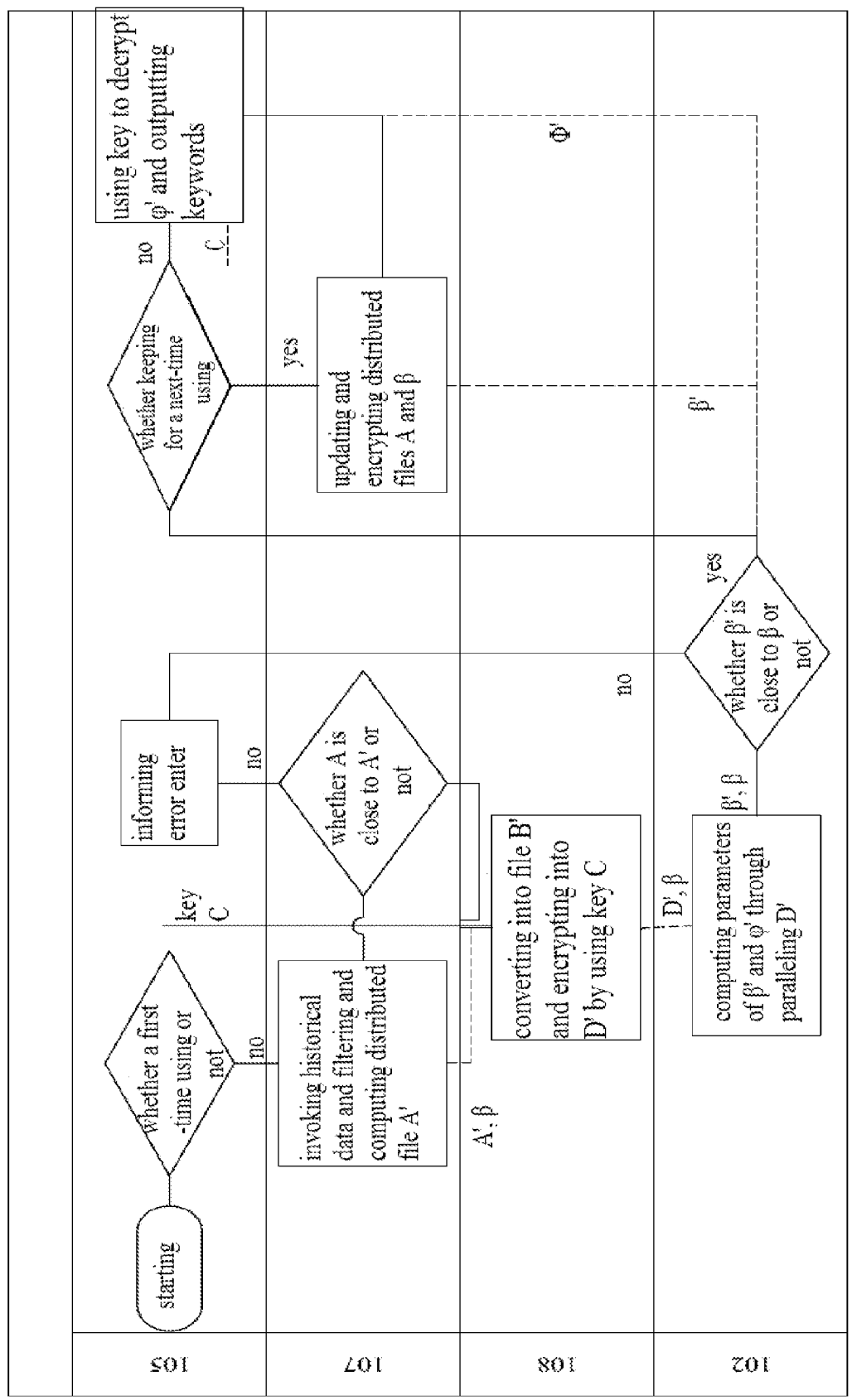
FIG. 7 is a flow chart of using the large-scale data cloud computing system subsequently according to the preferred embodiment of the present invention.

Referring from FIG. 1 to 7 of the drawings, according to a preferred embodiment of the present invention, a cloud computing system comprises:

a native client 105 which is a device having message storage and transmission ability comprising data aggregators like wireless sensors; and a platform system 102 providing distributed resources and a dynamic resource allocation, for receiving raw data uploaded by the native client 105 and returning computed results, comprising:

a data extracting module 107 for receiving the raw data;

an encrypting and decrypting module 108, wherein only a single user is permitted to simultaneously invoke the data extracting module 107 and the encrypting and decrypting module 108 and process the raw data; the encrypting and decrypting module 108 generates a key during a process of encrypting, returns the key to the single user to be kept and returns the computed result to the native client 105 after receiving the key inputted by the single user; and a data computing module 109, for computing the raw data encrypted by the encrypting and decrypting module 108 and returning results to the encrypting and decrypting module 108, wherein the data computing module 109 is shared by all users and can be invoked simultaneously by several users.

User invocations are divided into two situations of using for a first time and using subsequently. The subsequently using can adopt different files to keep on.

After invoking, a resource distribution unit limitedly arranges idle resources or resources closest to become idle to accomplish the invoked extracting unit or the invoked encrypting and decrypting unit. When a new invocation of the user occurs, new resources are arranged without affecting the extracting unit or the encrypting and decrypting unit of the ongoing user. Rest resources are classified into the computing unit and shared by all users.

When the user uses for the first time, as showed in S1, a part of information file A is recorded simultaneously; When the user uses subsequently, as showed in S8, a part of information file A' of new submitted file is computed and compared with the historical file A. As showed in S9, if A is not close to A', the user would be informed of new data error and process ends. Otherwise following steps are continued.

When the user uses for the first time, during an encrypting process S3, a key is generated and file extracted in the data extracting module 107 is encrypted in the encrypting and decrypting module 108. Simultaneously, the key is transmitted to the user and deleted in the encrypting and decrypting module 108.

When the user uses subsequently, as showed in S11, the user is required to submit the key; as showed in S12, after the user submits the key, an encryption is finished in the encrypting and decrypting module 108.

A key format is decided by user identification and file information, and thus it can be judged by the key of the user and the user information whether the key is wrong or not.

When the user uses for the first time, as showed in S5, the computed results (beta and lambda) are returned to the encrypting and decrypting module 108 and the user is asked whether the computed results need to be kept for being used thereafter.

If the computer results need to be kept, as showed in S6, the user information, the part of file information A and the computed results (beta and lambda) are encrypted together.

As showed in S7, the user is asked to submit the key; once the key is got, decrypted results are returned to the user after decrypting.

When the user uses subsequently, as showed in S14, the results are returned to the encrypting and decrypting module 108 and judged whether the results are close to historical results.

As showed in S15, if the results are not close to the historical results, it is informed that the entered new data does not match original data and the process ends.

As showed in S16, if the results match the historical results, the user is asked to submit the key; once the key is got, the decrypted results are returned to the user after decrypting.

As showed in S18, it is informed whether or not to keep the results.

As showed in S19, if the results need to be kept, the historical results and the part of information file A are accordingly updated and encrypted. Otherwise the process directly ends.

entering file

Firstly the entered file can comprise many types of discrete data, such as a file made of many words.

A following article is taken as an example.

"Nigeria plane crash survivor Report Nigeria Plane Crash Text Email facebook myspace google twitter Video Video survivors passenger plane people building Nigeria's city Lagos Sunday building plane Lagos. building water security area crowds helicopters area security Director-General Nigeria Civil Aviation Authority passengers aircraft passenger plane people building Nigeria city Lagos Sunday Dana Airlines Nigeria capital city Abuja to Lagos area airport people aircraft power line building accident Nigerian Allied Cargo air plane Ghana people passenger plan people buildingNigeria city Lagos Sunday building number residents fire building Nigerian President mourning Sunday president investigation travelers lessons life measures place country survivors passenger plane people building Nigeria city Lagos Sunday"

dictionary file

The dictionary file is a filter for filtering the entered file and only comprises some important words.

Following is a part of the dictionary file as an example.

dictionary form 1 area 2 building 3 city 4 crash

By using the dictionary, words beyond the dictionary are eliminated and a filtered part of the words is showed as follows, which is a first compression.

Nigeria plane crash survivor Report Nigeria Plane Crash Text Email facebook myspace google twitter Video Video survivors passenger plane people building Nigeria's city Lagos Sunday building plane Lagos building water security area crowds helicopters area security Director-General Nigeria Civil Aviation Authority passengers aircraft passenger plane people building Nigeria city Lagos Sunday Dana Airlines Nigeria capital city Abuja to Lagos area airport people aircraft power line building accident Nigerian Allied Cargo air plane Ghana people passenger plan people building Nigeria city Lagos Sunday building number residents fire building Nigerian President mourning Sunday president investigation travelers lessons life measures place country survivors passenger plane people building Nigeria city Lagos Sunday Further the words are matched with correspondent codes and identical words are concluded in a form of A: B, wherein A is the correspondent code of the word; B is a frequency of the word, which is a second compression.

This intermediate result is very important, temporarily named as an "entered file after being compressed"; this is an object to encrypt mentioned below and also a resource of the distributed file A.

post-filtering form

164:1

382:1

383:1

395:1

528:2

531:2

756:1
789:1
830:1
860:1
952:2
1031:1
3088:1
3375:2
3384:4
3385:3
3411:1
3682:1 distributed file, comparison of the new data and the historical data and updating The distributed file A is generated as follows. To be simple, several of the most frequent words after being re-arranged according to frequencies counted in each line of the "entered file after being compressed" of all files in a whole file set form the distributed file A.

The above post-filtering form is taken as an example. Supposing that the file set comprises only one file, the post-filtering form is rearranged based on the frequencies.

3384:4
3385:3
528:2
531:2
952:2
3375:2
164:1
382:1
383:1
395:1
756:1
789:1
830:1
860:1
1031:1
3088:1
3411:1
3682:1

According to the preferred embodiment of the present invention, the distributed file A comprises top 100 of the most frequent words arranged orderly, i.e., A={3384;3385;528;531;952;3375;164;382;383;395;756; 789;830;860;1031;3088;3411;3682;}

According to the preferred embodiment of the present invention, it is simple and direct to compare the two distributed files A and A' generated by inputting two different file sets by directly observing how many common words shared by the two file sets. If a common rate is over a predetermined rate, such as 50%, the two file sets are identified as an identical type of file set; otherwise the two file sets are identified as two different types. When the two file sets are identified as two different types, it is informed that newly entered file set does not match historical file set and the user is required to confirm again.

Usually after finishing processing the data, the historical distributed file A and the newly entered distributed file A' are integrated to update into a new distributed file, specifically as follows.

Firstly, common words existing in both A and A' are kept and the other words are chosen based on the frequencies to be kept.

Secondly, in a specific operation, the words in A and A' are all arranged based on the frequencies; it might as well be supposed that A and A' share common words comprising a1; a2; a3; . . . ; ak.

Thus A={a1;b11; . . . ; b1n1;a2;b21; . . . b2n2;a3 . . . }, i.e., A can be generated by inserting some words bi1; . . . ; bini into ai;ai+1; if ai;ai+1; are directly related in A, the correspondent ni is 0; otherwise ni is an amount of the inserted words. Similarly, A'={a1;c11; . . . ;c1 m1;a2;c21; . . . c2 m2;a3 . . . }.

It might as well be supposed that A and A' both have a volume of 100 and share 50 words in common, and thus 50 more words need to be chosen from the rest 100 ones. The 50 more words can be chosen by orderly picking c11; . . . ; c1m1; b11; . . . ; b1n1, c21; . . . c2 m2; b21; . . . b2n2; • • • until an i satisfies that m1+m2+m3+• • • mi+n1+n2+n3+• • • ni−1=50 and the picking process ends. Otherwise the i satisfied that m1+m2+m3+• • • mi−1+n1+n2+n3+• • • ni−1<50, while m1+m2+m3+• • • mi+n1+n2+n3+• • • +ni>50. Then counting that m=50−m1+m2+m3+• • • mi−1+n1+n2+n3+• • • ni−1, it is required to pick m words from ci1; . . . ; cimi; bi1; . . . ; bini. According to the preferred embodiment of the present invention, the m words are chosen randomly, i.e., each time one word is picked from parts to be chosen at an equal probability; then the picked word is deleted from candidates; and next word is picked from the rest parts until m words are all chosen.

encrypting and decrypting algorithm

The encrypting and decrypting algorithm is also an important result. Actually all the files of the whole file set need to be encrypted, so it might as well suppose the whole file set to be a file. In practical operations each file needs to be encrypted.

two forms of encrypting algorithm

According to the preferred embodiment of the present invention, the two forms of encrypting algorithm are illustrated, wherein a key is automatically generated and through the key it is finally realized to encrypt and decrypt file.

The two forms of encrypting algorithm are as follows. A first form of encrypting algorithm is based on RSA big prime number decomposition; a second form of encrypting algorithm is a purely random algorithm.

Firstly, it needs to be noticed that, in following "entered file after being compressed", on the left of ":" is an order number in the correspondent dictionary while an encryption is to disarrange the order numbers.

164:1
382:1
383:1 the first form

A number is randomly generated, such as translating 164 by 12345, and then the encrypted file displays as follows.

12509:1
12727:1
12728:1

A very big prime number N having at least 20 figures is generated; a translated number 12345*N is recorded after the encrypted file while N is the key returned to the user.

during decrypting

The user is required to submit the key. Through the last number of the encrypted file a translation number is obtained by division, embodied as 12345. Then the encrypted file is inversely operated, i.e., inversely translated, to finish decryption.

the second form

The second form is randomly choosing, realized by directly rearranging. The above file is taken as an example. It might as well be supposed that the file comprises three lines, such as 164:1
382:1
383:1
in an attempt to rearrange
164
382

A random rearrangement is showed as follows. For the first line, 164 is rearranged into 1 at a probability of ⅓, into 2 at a probability of ⅓ and into 3 at a probability of ⅓. For the second line, supposing that the first line has chosen 2, 382 is rearranged into 1 at a probability of ½ and into 3 at a probability of ½.

The last line is rearranged into the left number.

Thus correspondently the random arrangement is following.

164 1
382 1
383 1

The above arrangement is the key obtained by the user. By using the above one-to-one correspondence file to encrypt, a following form is generated.

2:1
3:1
1:1

Thus when it comes to an encryption of a file having N words, the numbers a1, a2, . . . , aN are respectively corresponded with 1, 2, . . . , N. Specific method thereof comprises following steps of:

(a) initializing a counter i=1 and a set Ω to be {1, 2, . . . , N};

(b) picking a number from Ω at a probability of 1/(N−i+1) to correspond with ai, counting the number as bi and updating the set Ω by deleting bi, i.e., Ω=Ω\{bi};

(c) adding 1 to the counter i and repeating the step of (b) until the counter reaches N;

(d) obtaining a file order respectively correspondent with ai and bi, wherein the file order is the key for users; and (e) when decrypting, by using the key for users, returning ai correspondent with each bi.

The file is the key for the users.

When decrypting, by using the key for users, ai correspondent with each bi is returned.

According to the preferred embodiment of the present invention, the encryption method aims to protect privacy of user data to a maximum degree; no matter the RSA algorithm or the random choice, it is very difficult to decrypt.

A method of realizing parallel is stated as follows. The parallel is realized by using a distributed parallel algorithm whose computing shares hardisk not memory. A key of parallel is to split the file set to realize that different computing units are in charge of different parts of the file set. Thus for P different computing units, the file set can be divided into different files. According to the preferred embodiment of the present invention, the computing units are divided into Master and Worker, wherein Worker receives data already divided, works, and returns results to Master; Master collects the results.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cloud computing system, comprising:
a native client which is a device having message storage and transmission ability; and
a platform computer system, providing distributed resources and dynamic resource allocation, for receiving raw data uploaded by said native client and returning computed results to said native client, comprising:
a data extracting module, comprising hardware and/or software, for receiving said raw data;
an encrypting and decrypting module, comprising hardware and/or software, wherein only a single user is permitted to invoke said data extracting module and said encrypting and decrypting module at each time for processing said raw data; said encrypting and decrypting module generates a key during a process of encrypting, returns said key to the single user to be kept, deletes said key from said platform system and returns said computed results to said native client after receiving said key inputted by the single user, in such a manner that said key is kept only by the single user;
a data computing module, comprising hardware and/or software, for computing said raw data encrypted by said encrypting and decrypting module to obtain said computed results and returning said computed results to said encrypting and decrypting module, wherein said data computing module is shared by all users and able to be invoked simultaneously by several users; after said data computing module returns said computed results to said encrypting and decrypting module, by using said key provided by the user, said encrypting and decrypting module decrypts said computed results; and
wherein, when the user uses said cloud computing system for a first time, said data extracting module records a first part of information file; when the user uses said cloud computing system subsequently, said data extracting module computes a second part of information file of newly entered file, and compares said second part of information file of said newly entered file with said first part of information file; if said first part of information file does not match said second part of information file, the user is informed of new data error; otherwise, when the user uses said cloud computing system for the first time, said key is generated and a file extracted in said data extracting module is encrypted in said encrypting and decrypting module; simultaneously, said key is transmitted to the user and deleted in said encrypting and decrypting module; when the user uses said cloud computing system subsequently, the user is asked to provide said key, and after the user submits said key, said encrypting and decrypting module starts encrypting.

2. The cloud computing system, as recited in claim 1, wherein said cloud computing system is used repeatedly; and when the user uses said cloud computing system subsequently, said data computing module provides an intelligent verification to judge whether new data matches historical data.

3. The cloud computing system, as recited in claim 2, wherein, after the user invokes said data extracting module or said encrypting and decrypting unit module, said platform computer system limitedly arranges idle resources or resources closest to become idle to accomplish said data extracting module or said encrypting and decrypting unit module invoked by the user; when a new invocation of the user occurs, new resources are arranged without affecting said data extracting unit module or said encrypting and decrypting unit module of the ongoing user; rest resources are classified into said data computing module and shared by all users.

4. The cloud computing system, as recited in claim 3, wherein when the user uses said cloud computing system for the first time, said computed results are returned to said encrypting and decrypting module, and the user is asked whether or not to keep said computed results for being used again; if yes, user information, said first part of file information and said computed results are encrypted together and the user is asked to provide said key; once said key is obtained by said platform system, decrypted results are returned to the user after decrypting.

5. The cloud computing system, as recited in claim 4, wherein the platform computer system informs whether to keep said computed results; if yes, historical results and said first part of information file are accordingly updated and encrypted.

6. The cloud computing system, as recited in claim 5, wherein said data extracting module respectively numbers key words in said first part of information file; said encrypting and decrypting module randomly generates a number, translates said number of key word by said number, and then said encrypting and decrypting module generates a prime number to multiply said translated number to obtain a multiplied result; said multiplied result is recorded after said encrypted file and returned to the user as said key; during decrypting the user is required to provide said key; through said multiplied result after said encrypted file, said translated number is obtained by dividing and said encrypted file is reversely translated to finish decryption.

7. The cloud computing system, as recited in claim 6, wherein, supposing that said raw data is divided into N sections respectively represented by ai, i={1, 2, ..., N}, a process by which said encrypting and decrypting module generate said key comprises following steps of:
   (a) initializing a counter i=1 and a set $\Omega$ to be $\{1, 2, \ldots, N\}$;
   (b) picking a number from $\Omega$ at a probability of $1/(N-i+1)$ to correspond with ai, marking the picked number as bi and updating the set $\Omega$ by deleting the picked number, i.e., $\Omega=\Omega\backslash\{bi\}$;
   (c) adding 1 to the counter i and repeating the step of (b) until the counter reaches N;
   (d) obtaining a file order of bi respectively correspondent with ai, wherein the file order is the key for users; and
   (e) when decrypting, by using the key for users, returning ai correspondent with each bi.

8. The cloud computing system, as recited in claim 5, wherein, supposing that said raw data is divided into N sections respectively represented by ai, i={1, 2, ..., N}, a process by which said encrypting and decrypting module generate said key comprises following steps of:
   (a) initializing a counter i=1 and a set $\Omega$ to be $\{1, 2, \ldots, N\}$;
   (b) picking a number from $\Omega$ at a probability of $1/(N-i+1)$ to correspond with ai, marking the picked number as bi and updating the set $\Omega$ by deleting the picked number, i.e., $\Omega=\Omega\backslash\{bi\}$;
   (c) adding 1 to the counter i and repeating the step of (b) until the counter reaches N;
   (d) obtaining a file order of bi respectively correspondent with ai, wherein the file order is the key for users; and
   (e) when decrypting, by using the key for users, returning ai correspondent with each bi.

9. The cloud computing system, as recited in claim 4, wherein said data extracting module respectively numbers key words in said first part of information file; said encrypting and decrypting module randomly generates a number, translates said number of key word by said number, and then said encrypting and decrypting module generates a prime number to multiply said translated number to obtain a multiplied result; said multiplied result is recorded after said encrypted file and returned to the user as said key; during decrypting the user is required to provide said key; through said multiplied result after said encrypted file, said translated number is obtained by dividing and said encrypted file is reversely translated to finish decryption.

10. The cloud computing system, as recited in claim 4, wherein, supposing that said raw data is divided into N sections respectively represented by ai, i={1, 2, ..., N}, a process by which said encrypting and decrypting module generate said key comprises following steps of:
    (a) initializing a counter i=1 and a set $\Omega$ to be $\{1, 2, \ldots, N\}$;
    (b) picking a number from $\Omega$ at a probability of $1/(N-i+1)$ to correspond with ai, marking the picked number as bi and updating the set $\Omega$ by deleting the picked number, i.e., $\Omega=\Omega\backslash\{bi\}$;
    (c) adding 1 to the counter i and repeating the step of (b) until the counter reaches N;
    (d) obtaining a file order of bi respectively correspondent with ai, wherein the file order is the key for users; and
    (e) when decrypting, by using the key for users, returning ai correspondent with each bi.

11. The cloud computing system, as recited in claim 3, wherein, when the user uses said cloud computing system subsequently, said computed results are returned to said encrypting and decrypting module to be judged whether said computed results match historical results; if no, it is informed that newly entered data does not match historical data; if yes, the user is asked to provide said key; once said key is obtained by said platform computer system, decrypted results are returned to the user after decrypting.

12. The cloud computing system, as recited in claim 11, wherein the platform computer system informs whether to keep said computed results; if yes, historical results and said first part of information file are accordingly updated and encrypted.

13. The cloud computing system, as recited in claim 11, wherein said data extracting module respectively numbers key words in said first part of information file; said encrypting and decrypting module randomly generates a number, translates said number of key word by said number, and then said encrypting and decrypting module generates a prime number to multiply said translated number to obtain a multiplied result; said multiplied result is recorded after said encrypted file and returned to the user as said key; during decrypting the user is required to provide said key; through said multiplied result after said encrypted file, said translated number is obtained by dividing and said encrypted file is reversely translated to finish decryption.

14. The cloud computing system, as recited in claim 11, wherein, supposing that said raw data is divided into N sections respectively represented by ai, i={1, 2, ..., N}, a process by which said encrypting and decrypting module generate said key comprises following steps of:
    (a) initializing a counter i=1 and a set $\Omega$ to be $\{1, 2, \ldots, N\}$;
    (b) picking a number from $\Omega$ at a probability of $1/(N-i+1)$ to correspond with ai, marking the picked number as bi and updating the set $\Omega$ by deleting the picked number, i.e., $\Omega=\Omega\backslash\{bi\}$;
    (c) adding 1 to the counter i and repeating the step of (b) until the counter reaches N;

(d) obtaining a file order of bi respectively correspondent with ai, wherein the file order is the key for users; and
(e) when decrypting, by using the key for users, returning ai correspondent with each bi.

15. The cloud computing system, as recited in claim 3, wherein the platform computer system informs whether to keep said computed results; if yes, historical results and said first part of information file are accordingly updated and encrypted.

16. The cloud computing system, as recited in claim 15, wherein said data extracting module respectively numbers key words in said first part of information file; said encrypting and decrypting module randomly generates a number, translates said number of key word by said number, and then said encrypting and decrypting module generates a prime number to multiply said translated number to obtain a multiplied result; said multiplied result is recorded after said encrypted file and returned to the user as said key; during decrypting the user is required to provide said key; through said multiplied result after said encrypted file, said translated number is obtained by dividing and said encrypted file is reversely translated to finish decryption.

17. The cloud computing system, as recited in claim 15, wherein, supposing that said raw data is divided into N sections respectively represented by ai, i={1, 2, ..., N}, a process by which said encrypting and decrypting module generate said key comprises following steps of:
(a) initializing a counter i=1 and a set $\Omega$ to be $\{1, 2, \ldots, N\}$;
(b) picking a number from $\Omega$ at a probability of $1/(N-i+1)$ to correspond with ai, marking the picked number as bi and updating the set $\Omega$ by deleting the picked number, i.e., $\Omega=\Omega\backslash\{bi\}$;
(c) adding 1 to the counter i and repeating the step of (b) until the counter reaches N;
(d) obtaining a file order of bi respectively correspondent with ai, wherein the file order is the key for users; and
(e) when decrypting, by using the key for users, returning ai correspondent with each bi.

18. The cloud computing system, as recited in claim 3, wherein said data extracting module respectively numbers key words in said first part of information file; said encrypting and decrypting module randomly generates a number, translates said number of key word by said number, and then said encrypting and decrypting module generates a prime number to multiply said translated number to obtain a multiplied result; said multiplied result is recorded after said encrypted file and returned to the user as said key; during decrypting the user is required to provide said key; through said multiplied result after said encrypted file, said translated number is obtained by dividing and said encrypted file is reversely translated to finish decryption.

19. The cloud computing system, as recited in claim 3, wherein, supposing that said raw data is divided into N sections respectively represented by ai, i={1, 2, ..., N}, a process by which said encrypting and decrypting module generate said key comprises following steps of:
(a) initializing a counter i=1 and a set $\Omega$ to be $\{1, 2, \ldots, N\}$;
(b) picking a number from 0 at a probability of $1/(N-i+1)$ to correspond with ai, marking the picked number as bi and updating the set $\Omega$ by deleting the picked number, i.e., $\Omega=\Omega\backslash\{bi\}$;
(c) adding 1 to the counter i and repeating the step of (b) until the counter reaches N;
(d) obtaining a file order of bi respectively correspondent with ai, wherein the file order is the key for users; and
(e) when decrypting, by using the key for users, returning ai correspondent with each bi.

* * * * *